US012656126B2

(12) United States Patent (10) Patent No.: US 12,656,126 B2
Matsumoto (45) Date of Patent: Jun. 16, 2026

(54) INFORMATION PROCESSING DEVICE, ELECTRONIC DEVICE, INFORMATION PROCESSING METHOD, AND RECORDING MEDIUM

(71) Applicant: CASIO COMPUTER CO., LTD., Tokyo (JP)

(72) Inventor: Kosuke Matsumoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 414 days.

(21) Appl. No.: 18/218,269

(22) Filed: Jul. 5, 2023

(65) Prior Publication Data

US 2024/0035826 A1 Feb. 1, 2024

(30) Foreign Application Priority Data

Jul. 28, 2022 (JP) ................................. 2022-120210

(51) Int. Cl.
*G01C 21/28* (2006.01)
*G01C 21/16* (2006.01)
*G01C 21/18* (2006.01)
(52) U.S. Cl.
CPC ............. *G01C 21/28* (2013.01); *G01C 21/18* (2013.01); *G01C 21/185* (2020.08)
(58) Field of Classification Search
CPC ...... G01C 21/28; G01C 21/18; G01C 21/185; G01C 21/343; G01C 21/3484; G01C 21/3476; A61B 5/02055; A61B 5/0022; A61B 5/02416; A61B 5/1116; A61B 5/1123; A61B 5/681; A61B 2560/0242; A61B 5/1112; A61B 5/1118; G16H 40/63; G16H 20/30; G16H 40/67; G16H 50/70

USPC .......................................................... 700/91
See application file for complete search history.

(56) References Cited

U.S. PATENT DOCUMENTS 6,542,817 B2 * 4/2003 Miyaki ............ G08G 1/096894
701/410
2006/0200304 A1 * 9/2006 Oh ...................... G01C 21/3644
701/426
2012/0283855 A1 * 11/2012 Hoffman ............... A61B 5/1118
700/91

(Continued)

FOREIGN PATENT DOCUMENTS

JP 2007192697 A 8/2007
JP 2011003151 A 1/2011

(Continued)

OTHER PUBLICATIONS

Japanese Office Action (and an English language translation thereof) dated Oct. 1, 2024, issued in counterpart Japanese Application No. 2022-120210.

(Continued)

*Primary Examiner* — Pierre E Elisca
(74) *Attorney, Agent, or Firm* — Holtz, Holtz & Volek PC

(57) ABSTRACT

An information processing device includes at least one processor. The processor acquires statistic information corresponding to a position or area obtained by an activity involving movement, acquires a feature quantity of the position or area obtained based on the statistic information, and associates description information corresponding to the feature quantity with a representative point that is a point representing the position or area.

15 Claims, 15 Drawing Sheets

(56)　　　　　References Cited

U.S. PATENT DOCUMENTS

| 2014/0288680 A1* | 9/2014 | Hoffman | ................ G16H 20/30 |
| | | | 700/91 |
| 2014/0371887 A1* | 12/2014 | Hoffman | ............... A61B 5/1118 |
| | | | 700/91 |
| 2015/0374307 A1 | 12/2015 | Nagasaka | |
| 2017/0153113 A1 | 6/2017 | Gotoh et al. | |
| 2017/0262698 A1* | 9/2017 | Hoffman | ............... A61B 5/1118 |
| 2020/0011688 A1* | 1/2020 | Lobo | ................. G01C 21/3415 |
| 2020/0143153 A1* | 5/2020 | Hoffman | ............... A61B 5/1118 |

FOREIGN PATENT DOCUMENTS

| JP | 2012159413 A | 8/2012 |
| JP | 2012184935 A | 9/2012 |
| JP | 2014230616 A | 12/2014 |
| JP | 2016010562 A | 1/2016 |
| WO | 2016002285 A1 | 1/2016 |

OTHER PUBLICATIONS

Japanese Office Action (and an English language translation thereof) dated Jun. 11, 2024, issued in counterpart Japanese Application No. 2022-120210.

* cited by examiner

ELECTRONIC DEVICE

| CONTROLLER | ~110 |

| STORAGE | ~120 |

| INPUTTER | ~130 |

| OUTPUTTER | ~140 |

| COMMUNICATOR | ~150 |

| SENSOR | ~160 |

| USER ID | P$_i$ |
|---|---|
| ACTIVITY LOG DATA | 2022/3/4 17:35 START<br>0:00  POSITION (E139.46, N35.41, H5.5 M),<br>ACCELERATION (x: 0.11, y: −0.12, z: 9.80),<br>ANGULAR VELOCITY (x: 0.13, y: 0.10, z: −0.11),<br>TRAVELING DIRECTION: 273° , SCORE: 83.5,<br>HEART RATE: 100 BPM,<br>BODY TEMPERATURE: 36.8° C,<br>BAROMETRIC PRESSURE: 1013 hPa,<br>PACE: 6 MIN/KM, STRIDE: 1.82 M,<br>PITCH: 252 SPM, PACE CHANGE: 0.1,<br>HEART RATE CHANGE: −1,<br>NUMBER OF STOPS: 0,<br>AMOUNT OF STATIONARY TIME: 0 SECONDS,<br>…<br>0:01  POSITION (E139.46, N35.41, H5.5 M),<br>…<br>0:02  POSITION (E139.46, N35.41, H5.5 M),<br>…<br>⋮ |
| | 2022/3/5 17:45 START<br>⋮ |
| | ⋮ |
| ⋮ | ⋮ |

Figure 5:
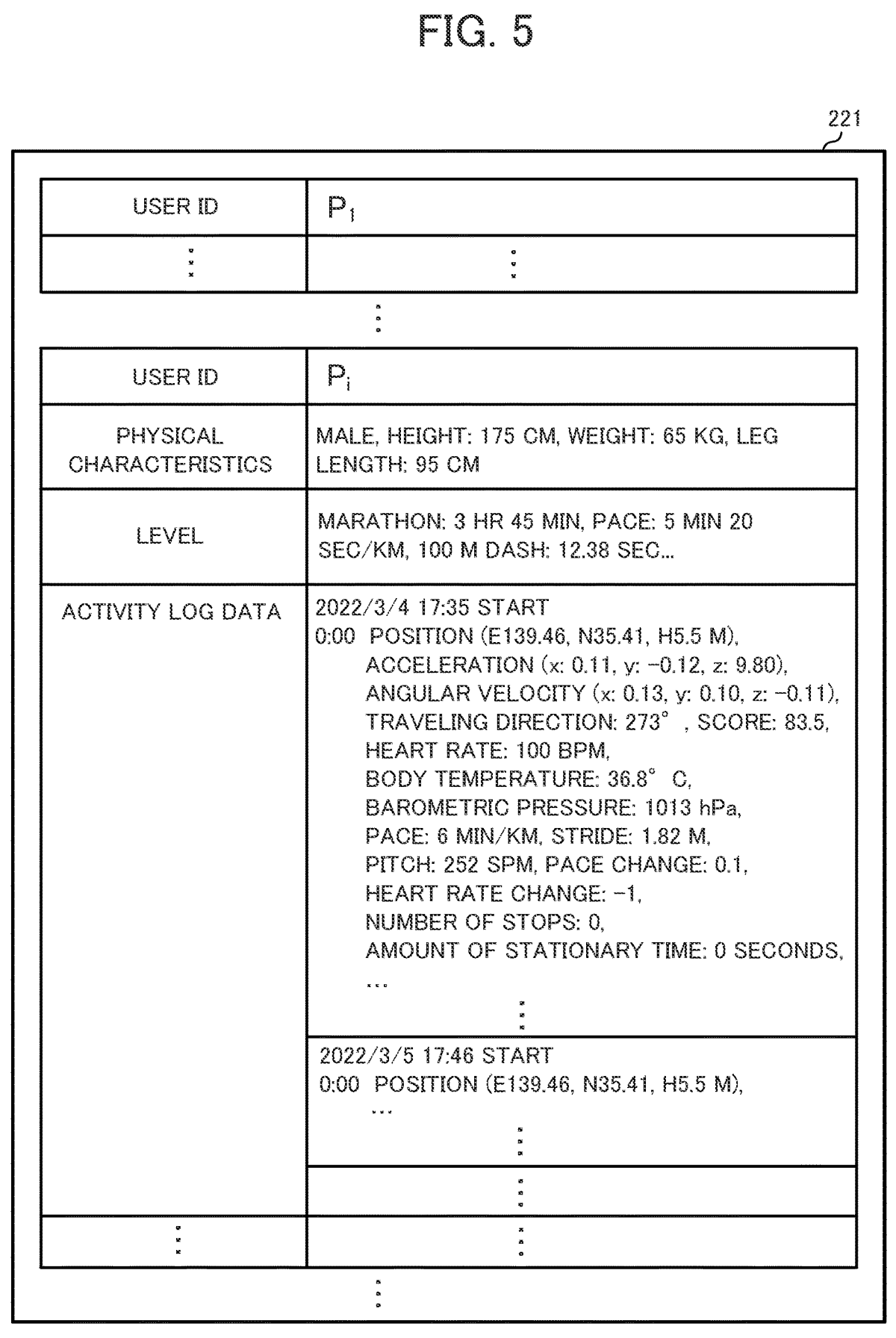

| USER ID | $P_1$ |
|---|---|
| ⋮ | ⋮ |

⋮

| USER ID | $P_i$ |
|---|---|
| PHYSICAL CHARACTERISTICS | MALE, HEIGHT: 175 CM, WEIGHT: 65 KG, LEG LENGTH: 95 CM |
| LEVEL | MARATHON: 3 HR 45 MIN, PACE: 5 MIN 20 SEC/KM, 100 M DASH: 12.38 SEC... |
| ACTIVITY LOG DATA | 2022/3/4 17:35 START<br>0:00 POSITION (E139.46, N35.41, H5.5 M),<br>     ACCELERATION (x: 0.11, y: −0.12, z: 9.80),<br>     ANGULAR VELOCITY (x: 0.13, y: 0.10, z: −0.11),<br>     TRAVELING DIRECTION: 273° , SCORE: 83.5,<br>     HEART RATE: 100 BPM,<br>     BODY TEMPERATURE: 36.8° C,<br>     BAROMETRIC PRESSURE: 1013 hPa,<br>     PACE: 6 MIN/KM, STRIDE: 1.82 M,<br>     PITCH: 252 SPM, PACE CHANGE: 0.1,<br>     HEART RATE CHANGE: −1,<br>     NUMBER OF STOPS: 0,<br>     AMOUNT OF STATIONARY TIME: 0 SECONDS,<br>     ...<br>     ⋮ |
| | 2022/3/5 17:46 START<br>0:00 POSITION (E139.46, N35.41, H5.5 M),<br>     ...<br>     ⋮ |
| | ⋮ |
| ⋮ | ⋮ |

| FEATURE QUANTITY CONDITION | | CAUSE | DESCRIPTION | BASIC INFORMATION |
|---|---|---|---|---|
| NUMBER OF FEATURE POINTS | MANY | RUNNERS PASS THROUGH FREQUENTLY | RUNNERS WITH RUNNING INDEXES SIMILAR TO YOU FREQUENTLY RUN IN THIS AREA | TO-DATE, X PEOPLE HAVE RUN HERE |
| | FEW | RUNNERS DO NOT PASS THROUGH FREQUENTLY | RUNNERS WITH RUNNING INDEXES NOT SIMILAR TO YOU FREQUENTLY RUN IN THIS AREA | |
| RUNNING INDEX (STRIDE) | LONG | THERE ARE MANY RUNNERS USING STRIDE RUNNING TECHNIQUE | THIS AREA IS SUITABLE FOR STRIDE RUNNING TECHNIQUE | |
| RUNNING INDEX (PITCH) | HIGH | THERE ARE MANY RUNNERS USING PITCH RUNNING TECHNIQUE | THIS AREA IS SUITABLE FOR PITCH RUNNING TECHNIQUE | |
| SCORE | HIGH | RUNNERS WITH GOOD FORM PASS THROUGH FREQUENTLY | YOU MAY BE ABLE TO LEARN FROM OTHER THE RUNNING FORM OF OTHER RUNNERS | IF YOUR SCORE IS X, YOU ARE HAVE THE YTH HIGHEST SCORE AMONG THE RUNNERS WHO HAVE PASSED THROUGH HERE |
| PACE | FAST | HIGH-LEVEL RUNNERS FREQUENTLY PASS THROUGH HERE | THIS IS AN AREA WITH MANY FAST-PACED PEOPLE, AND IT IS EASY TO RUN | IF YOUR PACE IS X, YOU ARE THE YTH FASTEST AMONG THE RUNNERS WHO HAVE PASSED THROUGH HERE |
| | SLOW | BEGINNER RUNNERS PASS THROUGH FREQUENTLY | THIS IS AN AREA WITH MANY SLOW-PACED RUNNERS, AND IS FOR BEGINNERS | |
| NUMBER OF STOPS | MANY | THERE ARE RESTING/ SIGHTSEEING ELEMENTS | THERE MAY BE INTERESTING THINGS AROUND | |
| AMOUNT OF STATION-ARY TIME | LONG | REST LOCATION | THIS IS A GOOD PLACE TO REST | THE AVERAGE REST TIME IS X MINUTES |
| INDEX CHANGE | GREAT | THERE IS AN ENVIRONMENT CHANGE | FORM IS DIFFICULT TO MAINTAIN HERE. BE AWARE. | |
| PACE CHANGE | GREAT | THERE IS AN ENVIRONMENT CHANGE | PACE IS DIFFICULT TO MAINTAIN HERE. BE AWARE. | |
| HEART RATE CHANGE | GREAT IN POSI-TIVE DIREC-TION | THERE IS AN ENVIRONMENT CHANGE | (WHEN A SLOPE) THIS IS A HEART-WRENCHING SLOPE WITH HEART RATE OF XXX (WHEN UNCLEAR IF A SLOPE) THIS AREA PUTS A LOT OF STRESS ON YOUR HEART | |
| ⋮ | ⋮ | ⋮ | ⋮ | |

FIG. 12

| CLUSTER REPRESENT-ATIVE POINT | FEATURE VALUE | | | | | | | | |
| --- | --- | --- | --- | --- | --- | --- | --- | --- | --- |
| | NUMBER OF FEATURE POINTS | STRIDE | PACE | HEART RATE | NUMBER OF STOPS | AMOUNT OF STATIONARY TIME | PACE CHANGE | HEART RATE CHANGE | ... |
| $FP_A$ | 3 | SMALL | SLOW | HIGH | — | SHORT | — | GREAT (+) | ... |
| $FP_B$ | 3 | SMALL | SLOW | LOW | — | LONG | SMALL (−) | SMALL (−) | ... |
| $FP_C$ | 2 | MEDIUM | FAST | HIGH | FEW | SHORT | SMALL (+) | SMALL (+) | ... |

| CLUSTER REPRESENT-ATIVE POINT | ACTIVITY DESCRIPTION INFORMATION |
| --- | --- |
| $FP_A$ | THIS IS A HEART-WRENCHING SLOPE WITH HEART RATE OF 180 |
| $FP_B$ | THIS IS A GOOD PLACE TO REST THE AVERAGE REST TIME IS 5 MINUTES |
| $FP_C$ | THIS IS AN AREA WITH MANY FAST-PACED PEOPLE, AND IT IS EASY TO RUN IF YOUR PACE IS 10KM/H, YOU ARE THE 3RD FASTEST AMONG THE RUNNERS WHO HAVE PASSED THROUGH HERE |

FIG. 14

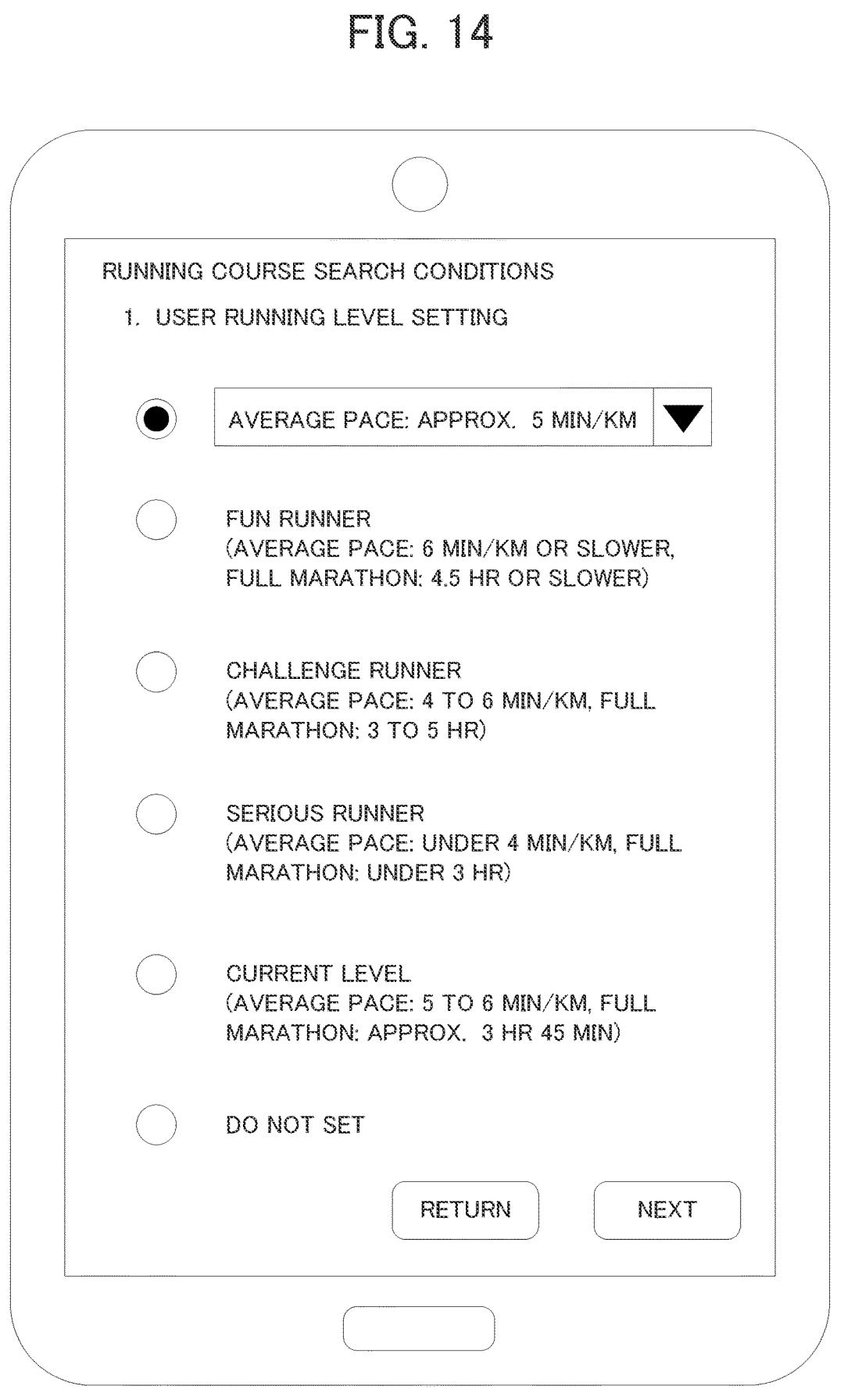

RUNNING COURSE SEARCH CONDITIONS

1.  USER RUNNING LEVEL SETTING

⦿    AVERAGE PACE: APPROX.  5 MIN/KM  ▼

○    FUN RUNNER
(AVERAGE PACE: 6 MIN/KM OR SLOWER,
FULL MARATHON: 4.5 HR OR SLOWER)

○    CHALLENGE RUNNER
(AVERAGE PACE: 4 TO 6 MIN/KM, FULL
MARATHON: 3 TO 5 HR)

○    SERIOUS RUNNER
(AVERAGE PACE: UNDER 4 MIN/KM, FULL
MARATHON: UNDER 3 HR)

○    CURRENT LEVEL
(AVERAGE PACE: 5 TO 6 MIN/KM, FULL
MARATHON: APPROX.  3 HR 45 MIN)

○    DO NOT SET

[ RETURN ]    [ NEXT ]

FIG. 15

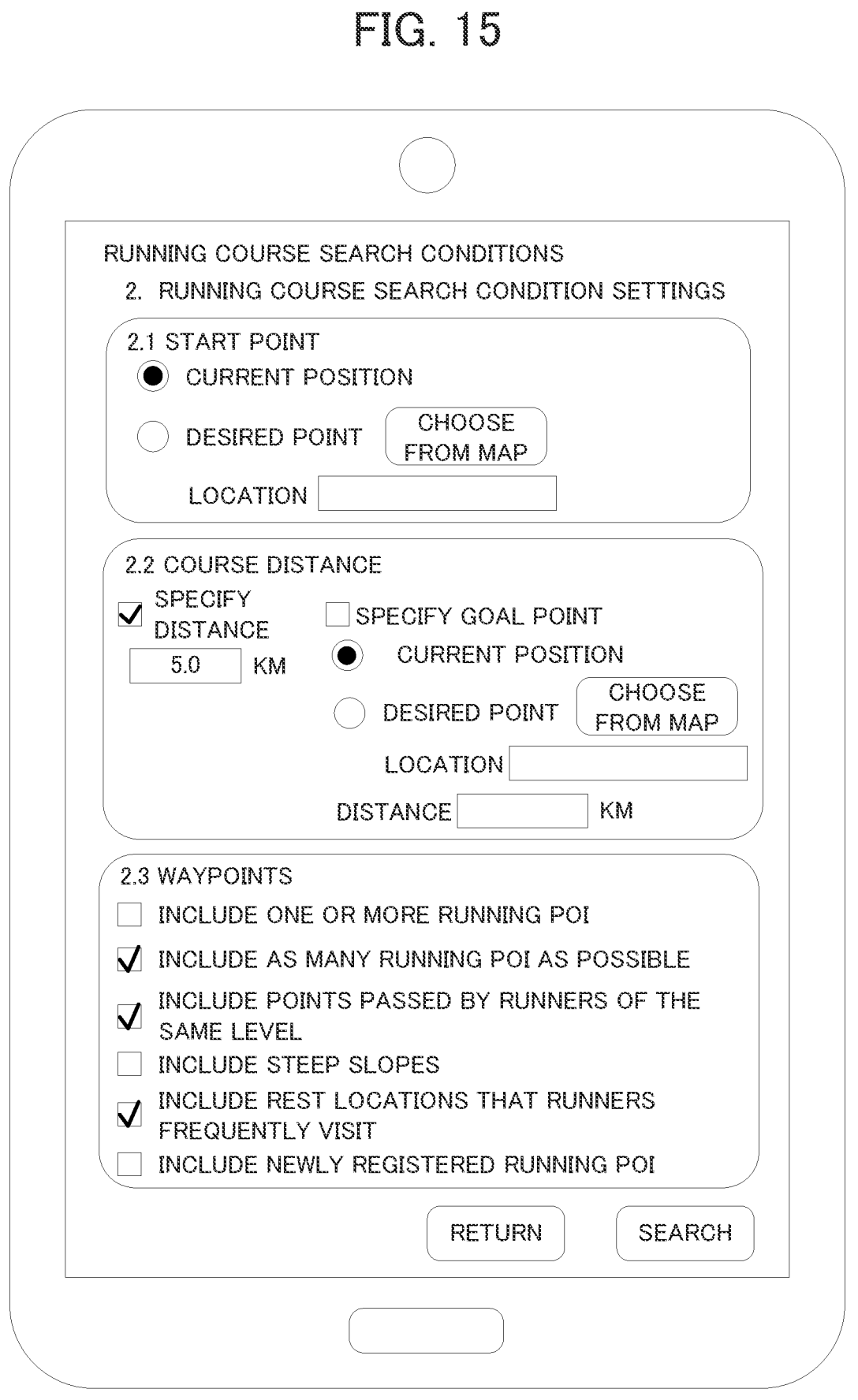

RUNNING COURSE SEARCH CONDITIONS

2.  RUNNING COURSE SEARCH CONDITION SETTINGS 2.1 START POINT

● CURRENT POSITION

○ DESIRED POINT    CHOOSE FROM MAP

LOCATION [ ]

2.2 COURSE DISTANCE

☑ SPECIFY DISTANCE    ☐ SPECIFY GOAL POINT

[ 5.0 ] KM    ● CURRENT POSITION

○ DESIRED POINT    CHOOSE FROM MAP

LOCATION [ ]

DISTANCE [ ] KM 2.3 WAYPOINTS

☐ INCLUDE ONE OR MORE RUNNING POI

☑ INCLUDE AS MANY RUNNING POI AS POSSIBLE

☑ INCLUDE POINTS PASSED BY RUNNERS OF THE SAME LEVEL

☐ INCLUDE STEEP SLOPES

☑ INCLUDE REST LOCATIONS THAT RUNNERS FREQUENTLY VISIT

☐ INCLUDE NEWLY REGISTERED RUNNING POI

[ RETURN ]    [ SEARCH ]

INFORMATION PROCESSING DEVICE, ELECTRONIC DEVICE, INFORMATION PROCESSING METHOD, AND RECORDING MEDIUM

CROSS-REFERENCE TO RELATED APPLICATIONS

This application claims the benefit of Japanese Patent Application No. 2022-120210, filed on Jul. 28, 2022, the entire disclosure of which is incorporated by reference herein.

FIELD OF THE INVENTION

This application relates generally to an information processing device, an electronic device, an information processing method, and a recording medium.

BACKGROUND OF THE INVENTION

A variety of navigation devices for guiding a user to a destination or the like by displaying a map have been developed. Examples of such devices include not only car navigation devices used when driving a vehicle, but also navigation devices for bicycles and navigation devices used when walking or running. For example, Unexamined Japanese Patent Application Publication No. 2012-159413 describes a navigation device that sets a route in consideration of the health of the user when walking, running, a using a bicycle or the like as the movement method of the user.

SUMMARY OF THE INVENTION

An aspect of an information processing device according to the present disclosure that achieves the objective described above includes:

at least one processor, wherein
the processor
    acquires statistic information corresponding to a position or area obtained by an activity involving movement,
    acquires a feature quantity of the position or area obtained based on the statistic information, and
    associates description information corresponding to the feature quantity with a representative point that is a point representing the position or area.

BRIEF DESCRIPTION OF DRAWINGS

A more complete understanding of this application can be obtained when the following detailed description is considered in conjunction with the following drawings, in which:

Figure 2:
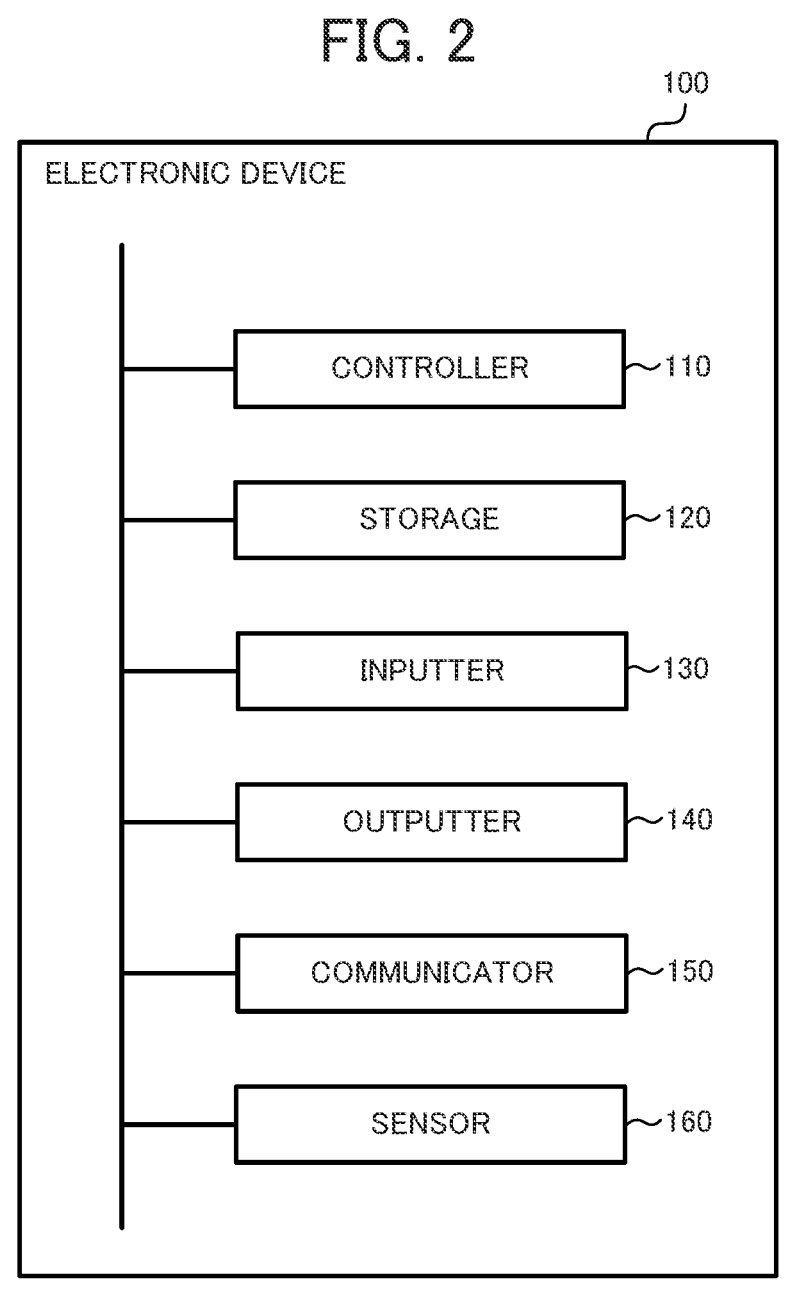

FIG. 2 is a block diagram illustrating the functional configuration of an electronic device according to the embodiment;

FIG. 4 is a drawing illustrating an example of activity log data;

FIG. 5 is a drawing illustrating an example of a runner database;

FIG. 11 is a drawing illustrating an example of a feature quantity correspondence table according to the embodiment;

FIG. 12 is a drawing explaining the generation of description information from the feature quantities of representative points of the clusters;

FIG. 14 is an example of a screen, in the route guiding processing according to the embodiment, for setting a running level of the user of information of routes desired by the user;

FIG. 15 is an example of a screen, in the route guiding processing according to the embodiment, for setting a start point, a course distance, a waypoint, and the like as search conditions for a running course of the information of routes desired by the user;

DETAILED DESCRIPTION OF THE INVENTION

Figure 1:
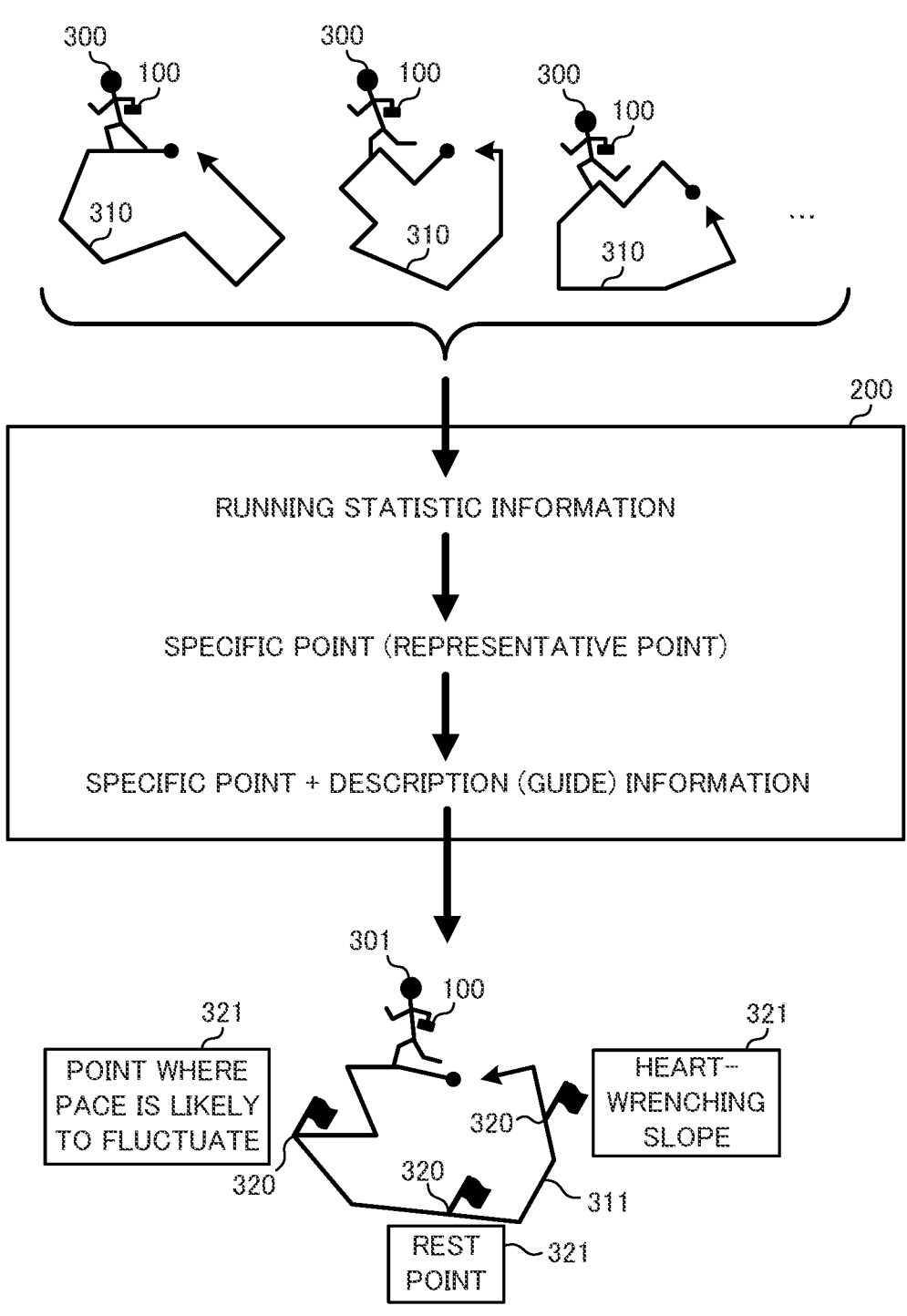
FIG. 1 is a drawing explaining an overview of an information processing system according to an embodiment.

An information processing system and the like according to various embodiments are described while referencing the drawings. Note that, in the drawings, identical or corresponding components are denoted with the same reference numerals.

Embodiments

An information processing system according to the present embodiment includes an electronic device 100 and a server 200. As illustrated in FIG. 1, the electronic device 100 collects, as running statistic information, position information on a route 310 and various types of sensor information from when each runner of a plurality of runners 300 runs; and the server 200 analyzes the collected running statistic information, and extracts, as description points 320, points at which the running statistic information expresses a feature-like value. Each description point 320 can be provided with description information 321 expressing a feature of that point and, as such, can be treated as a so-called point of interest (POI). Additionally, the server 200 can search for a route 311, that passes through a description point 320 matching a desire of a user 301, to propose a running course that matches a condition desired by the user.

The electronic device 100 is an information processing device carried by the runner 300 (including the user 301)

when running. In one example, the electronic device 100 is implemented as a smartwatch. As illustrated in FIG. 2, the electronic device 100 includes a controller 110, a storage 120, an inputter 130, an outputter 140, a communicator 150, and a sensor 160.

In one example, the controller 110 is configured from a processor such as a central processing unit (CPU) or the like. The controller 110 executes, by a program stored in the storage 120, processing for realizing the various functions of the smartwatch, hereinafter described route guide processing, and the like.

The storage 120 stores programs to be executed by the controller 110 and necessary data. The storage 120 may include random access memory (RAM), read-only memory (ROM), flash memory, or the like, but is not limited thereto. Note that the storage 120 may be provided inside the controller 110.

The inputter 130 is a user interface such as a push button switch, a touch panel, or the like, and receives operation inputs from the user. When the inputter 130 includes a touch panel, the touch panel may be integrated with a display of the outputter 140.

The outputter 140 includes a display such as a liquid crystal display, an organic electro-luminescence (EL) display, or the like, and displays display screens, operation screens, and the like that provide the functions of the electronic device 100. Additionally, the outputter 140 includes a sound output means such as a speaker or the like and can output, by speech, the description information provided to the description point.

In one example, the communicator 150 is implemented as network interface that is compatible with a wireless local area network (LAN), long term evolution (LTE), or the like. The electronic device 100 can communicate with other information processing devices such as the server 200 and the like via the communicator 150.

The sensor 160 includes devices that detect various values related to activities (running, walking, and the like) of the user. Examples of the devices include a heart rate sensor, a temperature sensor, a barometric pressure sensor, an acceleration sensor, a gyrosensor, a global positioning system (GPS) device, and the like. The controller 110 can acquire, as a detected value, the value detected by each device of the sensor 160 at a desired timing. However, a configuration is possible in which the sensor 160 does not include all of the sensors described above and, for example, may include the temperature sensor and the barometric pressure sensor.

In one example, the heart rate sensor detects a pulse by a photoplethysmography (PPG) sensor that includes a light emitting diode (LED) and a photodiode (PD). The controller 110 can acquire the heart rate by measuring a pulse rate (number of heartbeats) per unit time (for example, one minute), on the basis of a pulse wave detected by the heart rate sensor. In one example, the temperature sensor includes a thermistor, and can measure a body temperature. In one example, the barometric pressure sensor includes a piezoresistive integrated circuit (IC), and can measure the ambient barometric pressure.

The acceleration sensor detects acceleration, in each direction of three orthogonal axes (X axis, Y axis, Z axis) of the electronic device 100. The gyrosensor detects an angular velocity of rotation, with each of the three orthogonal axes (X axis, Y axis, Z axis) as the rotation axis, of the electronic device 100. The GPS device (satellite positioning device) acquires a current position (for example, three-dimensional data including latitude, longitude, and altitude) of the electronic device 100. The sensor 160 functions as a position acquirer when acquiring a current position of the electronic device 100.

Typically, the electronic device 100 is worn on a wrist of the user, and the controller 110 calculates a position, a speed, a heart rate, various types of running indexes, and the like of the user on the basis of various types of detected values detected by the sensor 160, and stores the calculation results in the storage 120 as the running statistic information. Moreover, during or after running by the user, the controller 110 sends the running statistic information stored in the storage 120 to the server 200 using the communicator 150.

Figure 3:
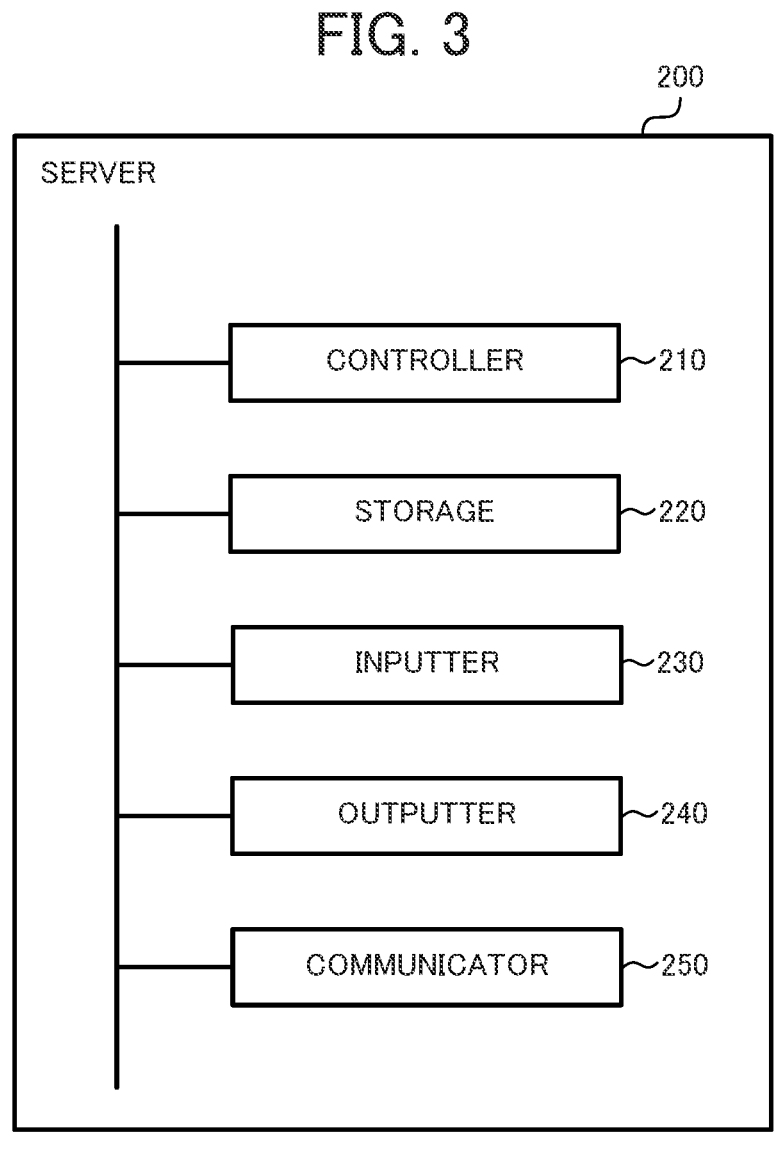
FIG. 3 is a block diagram illustrating the functional configuration of a server according to the embodiment.

The server 200 is an information processing device that analyzes the running statistic information collected by the electronic device 100. As illustrated in FIG. 3, the server 200 includes a controller 210, a storage 220, an inputter 230, and outputter 240, and a communicator 250.

In one example, the controller 210 is configured from a processor such as a central processing unit (CPU) or the like. The controller 210 executes, by a program stored in the storage 220, processing for realizing the various functions of the server 200, hereinafter described description point generation processing, and the like.

The storage 220 stores programs to be executed by the controller 210 and necessary data (for example, a hereinafter described runner database 221, map information, a description point database, and the like). The storage 220 may include random access memory (RAM), read-only memory (ROM), flash memory, or the like, but is not limited thereto. Note that the storage 220 may be provided inside the controller 210.

The map information stored in the storage 220 includes at least information of a map of the vicinity of a course that the user runs. Additionally, the map information includes geographical feature data, road network data, and information about specific points (so-called POI data). The geographical feature data includes roads, railroads, shops, facilities, traffic lights, roadside trees, and other objects that physically exist (real geographical features), and boundaries, place names, bus routes, and other objects that do not physically exist (imaginary geographical features). The road network data is data that is used in route searching, navigation, and the like, and includes links indicating roads, and nodes (for example, intersections) that connect a plurality of the links. The information about specific points (POI data) is data for identifying positions of locations that are points representing geographical features, namely general roads, expressways, stores such as convenience stores, facilities such as train stations, parks, and the like. The information about specific points includes description information (for example, business hours, telephone numbers, email addresses, and the like) about these geographical features. Moreover, the controller 210 searches waypoints while referencing the information about specific points when searching for a running course desired by the user.

The description point database is a database in which the positions of the description points, feature quantities, and the description information are recorded by hereinafter described description point generation processing.

The inputter 230 is implemented as a user interface such as a keyboard, a mouse, a touch panel, or the like, and receives operation inputs from the user. When the inputter 230 includes a touch panel, the touch panel may be integrated with a display of the outputter 240.

The outputter 240 includes a display such as a liquid crystal display, an organic electro-luminescence (EL) display, or the like, and displays display screens, operation screens, and the like that provide the functions of the server 200.

In one example, the communicator 250 is implemented as network interface that is compatible with a wireless local area network (LAN), long term evolution (LTE), or the like. The server 200 can communicate with other information processing devices such as the electronic device 100 and the like via the communicator 250.

When the user starts running while wearing the electronic device 100, the controller 110 periodically (for example, every one second) records, in the storage 120 and as activity history of the user, activity log data 121 such as illustrated in FIG. 4. In the example of FIG. 4, the activity log data 121 includes position information acquired by the GPS device, acceleration information acquired by the acceleration sensor, angular velocity information acquired by the gyrosensor, heart rate information acquired by the heart rate sensor, body temperature information acquired by the temperature sensor, barometric pressure information acquired by the barometric sensor and, also, various types of indexes calculated from these pieces of information (traveling direction, score, and various running indexes (pace, stride, pitch, and the like)), amounts of change of these pieces of information and various types of indexes (pace change, heart rate change, and the like), and data related to a recent action (number of stops, amount of stationary time, and the like).

However, the type of information included in the activity log data may be determined as desired. For example, it is possible to only record values obtained by the sensor 160, such as the position, the acceleration, the angular velocity, and the heart rate as the activity log data 121. Additionally, it is possible to also record, as the activity log data 121, action content (resting, walking, running, and the like), estimated on the basis of the values obtained by the sensor 160 and the like.

Note that, in the example of FIG. 4, data from when starting running at 17:35 on 2022/3/4 is recorded every one second as the first activity log data 121. In this activity log data 121, the position information is information of the latitude, the longitude, and the altitude. Additionally, the acceleration information is acceleration in the each of the X, Y, and Z directions, and the angular velocity information is the angular velocity of rotation with each of the X, Y, and Z axes as the rotation axis. The traveling direction is the direction in which the user is traveling and is, for example a numerical value in a case in which true north is expressed as 0°, true east is expressed as 90°, true south is expressed as 180°, and true west is expressed as 270°.

The score illustrated in FIG. 4 is obtained by converting a running level of the user to a numerical value, and is calculated on the basis of the detected values (acceleration and the like) that are values detected by the sensor 160. For example, the value of the score increases when posture (posture of the whole body or posture of part of the body (torso, arms, hips, legs, pelvis, and the like)) when running is good, when running such that the load on the body (the whole body or a part of the body) is small, when movement of the whole body or a part of the body is smooth, and the like. Conversely, the value of the score decreases when the opposite is true (for example, posture when running is poor, there is a large amount of wasted movement, and the like).

In FIG. 4, the pace (amount of time required to run 1 km), the stride (distance traveled in one step from one ground contact to the next ground contact), and the pitch (number of steps per one minute) are recorded as the running indexes. However, the controller 110 may calculate, on the basis of the data obtained from the sensor 160, various indexes for evaluating the running of the user, and record the calculated indexes as the activity log data 121.

In FIG. 4, the pace change (amount of change of pace, for example, difference from pace one second before), and the heart rate change (amount of change of heart rate, for example, difference from heart rate one second before) are recorded. However, the controller 110 may calculate amounts of change for the running indexes and other desired information (for example, difference from a value one second before), and record the calculated amounts of change as the activity log data 121.

In FIG. 4, the number of stops (number of stops in a narrow area of a certain range (for example, an area within 10 m of the current position)) and the amount of stationary time (for example, the amount of time stationary in the last three minutes) are recorded as the data related to a recent action. However, the controller 110 may record, on the basis of the position, the acceleration, the angular velocity, the heart rate, and the like, any desired data related to a recent action as the activity log data 121.

Moreover, the controller 110 of the electronic device 100 can send the activity log data 121 recorded in the storage 120 to the server 200 via the communicator 150.

The server 200 receives, from the electronic device 100 via the communicator 250, the activity log data 121 recorded by the electronic device 100 by a plurality of runners, and records the received activity log data 121 as a runner database 221 such as illustrated in FIG. 5. In the runner database 221, a user ID is recorded for each runner and, for every user ID, activity log data corresponding to that user ID and, also, physical characteristics (gender, height, weight, and the like) and levels (marathon time, average pace, short dash time, and the like) corresponding to that user ID are recorded. Each user can, at a desired timing, access the server 200 using the electronic device 100, or use the inputter 230 of the server 200 or the like to register information about the physical characteristics and the levels corresponding to the user ID of each user in the runner database 221.

Figure 6:
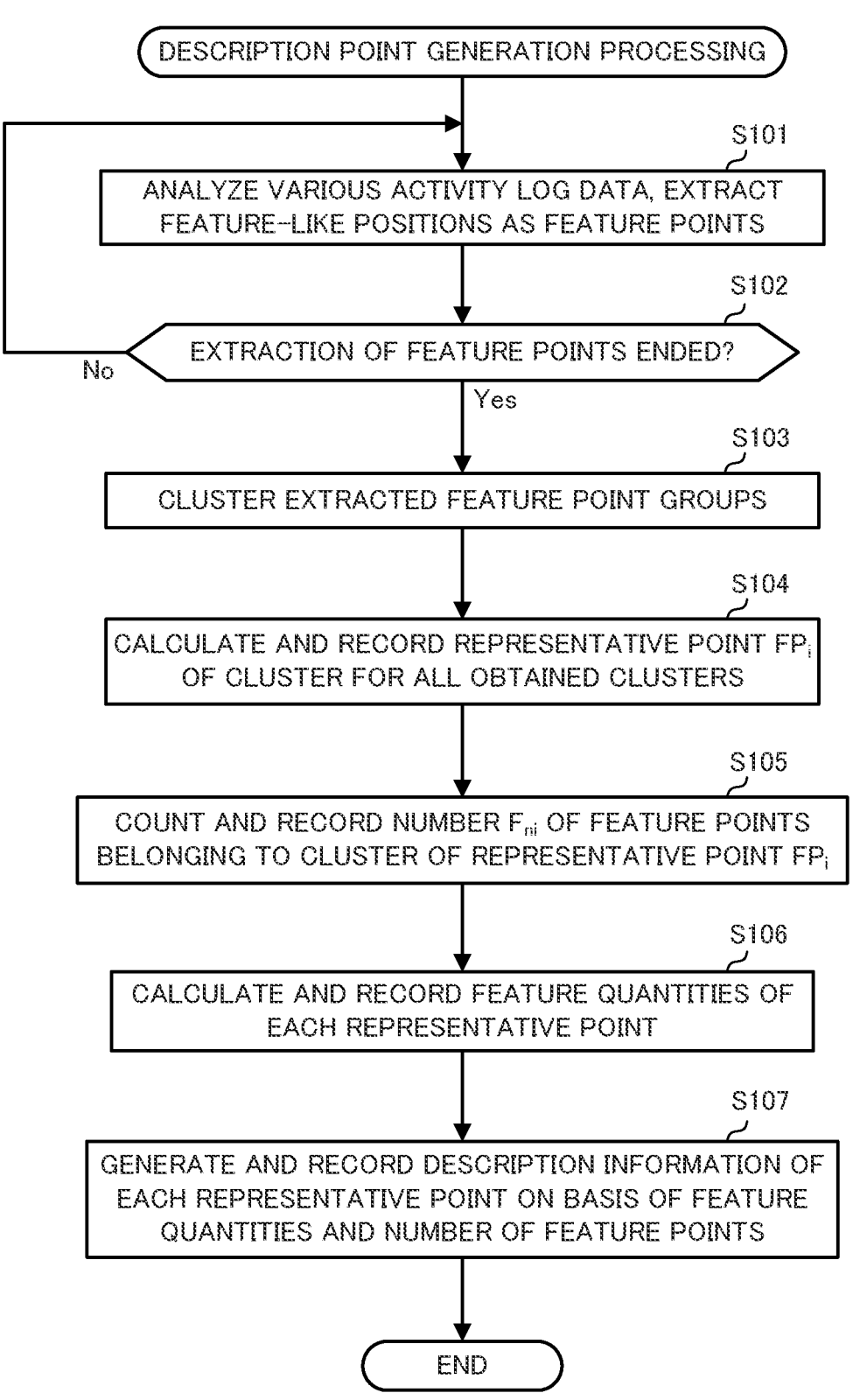
FIG. 6 is a flowchart of description point generation processing according to the embodiment.

The server 200 can use the activity log data registered in the runner database 221 as the statistic information to extract a certain point that where sort of feature exists, and generate the description information for that point. This processing (description point generation processing) is described while referencing FIG. 6. The description point generation processing can be started at a desired timing but, in one example, the server 200 starts the description point generation processing when the receiving of new activity log data from the electronic device 100 is ended.

However, depending on the electronic device 100, there are cases in which only data acquired from the sensor 160 (for example, the position, the acceleration, the angular velocity, the heart rate, and the like) are recorded as the activity log data. In such cases, the server 200 calculates other data (for example, the traveling direction, the score, the pace, the stride, the pitch, the pace change, the heart rate change, the number of stops, the amount of stationary time, and the like illustrated in FIG. 5) from the received data, and adds the calculated data to the activity log data.

Firstly, the controller 210 analyzes the various activity log data, and extracts feature-like positions as feature points (step S101). The feature-like positions are, for example, positions such as those described below, and are stored in the storage 220 for every user (linked to the user ID) with the positions (the latitude, the longitude, and the altitude) thereof as the feature points. Note that the values of the activity log data used in this extraction can be regarded as the feature quantities of that feature point.

Positions where a value (absolute value) included in the activity log data reaches a threshold (for example, the heart rate exceeds a heart rate threshold (for example, 200), the number of stops is greater than or equal to a number of stops threshold (for example, three times), the amount of stationary time exceeds an amount of stationary time threshold (for example, one minute), the pace is slower than a stopping threshold (for example, 120 min/km), and the like).

Positions where an amount of change of a value included in the activity log data reaches a threshold (for example, a change of the traveling direction is greater than or equal to an angle change threshold (for example, 60°), an amount of change of the pace is greater than or equal to a pace change threshold (for example, 20 min/kin), an amount of change of the pace is less than a pace stability threshold (for example, 1 min/km), an amount of change of the heart rate exceeds a heart rate change threshold (for example, 20 bpm), and the like).

Of these feature points, points where the change of the traveling direction is greater than or equal to the angle change threshold are feature points expressing a feature of a shape representing a route and, as such, are also called "shape feature points." Note that the controller 210 may extract the shape feature points on the basis of angle changes of the traveling direction as described above, or may extract the shape feature point using the Douglas-Peucker algorithm or the like. In addition to the feature-like positions, the feature points may also be feature-like areas (for example, a narrow area within 10 m of a reference position). This is because feature quantities acquired in a narrow area of a certain range such as the number of stops and the like described above are also possible.

Next, the controller 210 determines whether the extraction of the feature points is ended (step S102). For example, the controller 210 determines that the extraction of the feature points is ended when the analyses of all of the activity log data recorded in the runner database 221 are ended. When the extraction of the feature points is not ended (step S102; No), step S101 is executed.

Figure 7A:
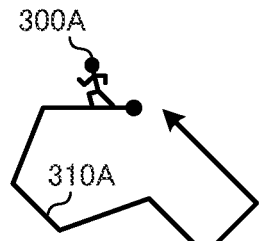
FIG. 7A is a drawing illustrating an example of a route of each runner when acquiring the activity log data.
Figure 7B:
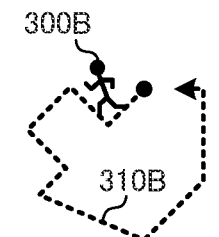
FIG. 7B is a drawing illustrating an example of a route of each runner when acquiring the activity log data.
Figure 7C:
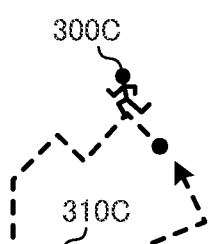
FIG. 7C is a drawing illustrating an example of a route of each runner when acquiring the activity log data.
Figure 8A:
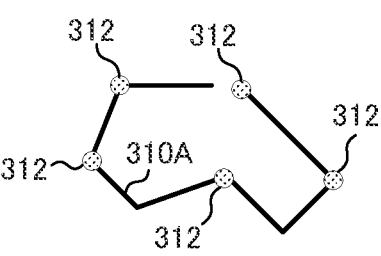
FIG. 8A is a drawing illustrating an example of feature points extracted from the activity log data.
Figure 8B:
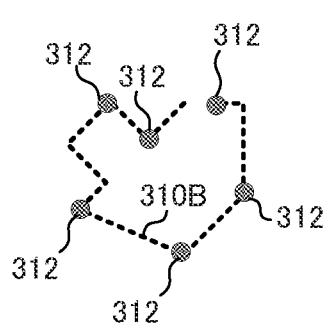
FIG. 8B is a drawing illustrating an example of feature points extracted from the activity log data.
Figure 8C:
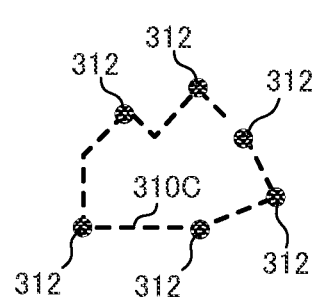
FIG. 8C is a drawing illustrating an example of feature points extracted from the activity log data.

For example, as illustrated in FIGS. 7A to 7C, individual runners 300A, 300B, and 300C respectively run on routes 310A, 310B, and 310C that are in the same area. The activity log data obtained by this running is recorded in the runner database 221 of the storage 220 of the server 200. As a result, feature points 312 such as illustrated in FIGS. 8A to 8C, for example, are extracted by the processing of steps S101 and S102. Here, the feature points 312 illustrated in FIGS. 8A to 8C respectively represent the feature points on the routes 310A, 310B, and 310C illustrated in FIGS. 7A to 7C.

Figure 9:
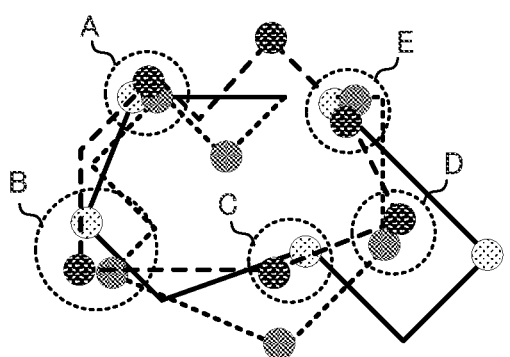
FIG. 9 is a drawing explaining clustering of the feature points.
Figure 10:
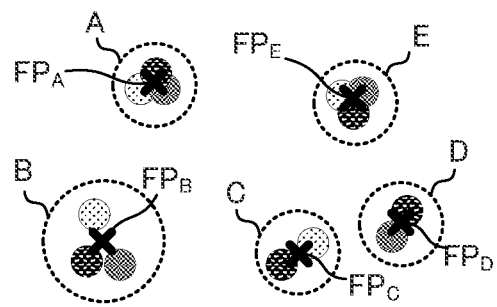
FIG. 10 is a drawing illustrating an example of clusters obtained by the clustering of the feature points.

When the extraction of the feature points is ended (step S102; Yes), the controller 210 clusters the extracted feature point group on the basis of the position of each feature point (step S103). For example, each feature point 312 illustrated in each of FIGS. 8A to 8C exists on each of the routes 310A, 310B, and 310C illustrated in FIGS. 7A to 7C that are in the same area in the map. Accordingly, position information is associated with each feature point 312 illustrated in each of FIGS. 8A to 8C. Here, the controller 210 plots, in space, each feature point 312 of FIGS. 8A to 8C on the basis of the position information of each feature point 312 illustrated in each of FIGS. 8A to 8C, and performs clustering on the plotted feature points. As a result, as illustrated in FIG. 9, for example, a plurality of feature points relatively near to a certain position are included in one cluster. FIG. 10 illustrates, as the results of the clustering, the feature points classified into five clusters, namely clusters A, B, C, D, and E. Note that, in the clustering illustrated in FIG. 9, the clustering is carried out such that a plurality of feature points is included in each cluster, but the clustering may be carried out such that clusters may exist in which only one feature point is included. Note that clustering methods are known techniques and, as such, description thereof is omitted.

Note that, for every user, biases may occur in the feature points extracted in steps S101 and S102 (for example, a user 1 performs running many times so a large amount of activity log data exists, but user 2 performs running only one time and only an amount of activity log data corresponding to one time exists, and the like). As such, in order to eliminate the bias for every user, a configuration is possible in which the feature points are extracted from only the activity log data corresponding to one instance of running for every user (for example, for every user, only the activity log data from the most recent instance of running is used in the extraction of the feature points). Even in such a case, the server 200 can collect the activity log data from a large number of runners and, as such, can extract a sufficient number of feature points.

Then, for all of the clusters obtained by the clustering, the controller 210 calculates a representative point $FP_i$ of a cluster i, and records the results in the description point database of the storage 220 (step S104). Any method can be used to calculate the representative points of the clusters. For example, a center of gravity of the positions of all of the feature points belonging to the cluster can be set as the representative point. In FIG. 10, the center of gravity of the three feature points belonging to the cluster A is set as the representative point $FP_A$ of the cluster A, the center of gravity of the three feature points belonging to the cluster B is set as the representative point $FP_B$ of the cluster B, and the center of gravity of the two feature points belonging to the cluster C is set as the representative point $FP_C$ of the cluster C. A representative point $FP_D$ of the cluster D and the representative point $FP_E$ of the cluster E are defined in the same manner.

Additionally, these centers of gravity are points whose coordinates are the average values of the various coordinates of the feature points, but points whose coordinates are median values of the various coordinates may be used as the representative points, or points whose coordinates are modes of the various coordinates may be used as the representative points. More generally, of the clusters obtained by the clustering, in clusters in which the number of feature points (cluster configuration points) belonging to that cluster is greater than or equal to a threshold (for example, 2), it is sufficient that a point, whose coordinates are representative values (average values, median values, modes, or the like) of the coordinates of the cluster configuration points, is used as the representative point of that cluster.

Next, the controller 210 counts a number Fni of the feature points belonging to the cluster (cluster i) of the representative point $FP_i$, and records the counted number Fni in the description point database (step S105). Then, the controller 210 calculates the feature quantities of each calculated representative point, and records the calculated feature quantities in the description point database (step S106). Any method can be used to calculate the feature quantities. In one example, average values of the feature points belonging to the cluster of the representative point are used as the feature quantities. However, when variance (or standard deviation) of the feature quantities of the feature points is great, there is no reason to use average values. As such, fundamentally, average values are used as the feature quantities, but a reliability of each feature quantity (average value) is also calculated (for example, reliability=1/(variance+1)), and feature quantities with high reliability are used to generate the description information and calculate a degree of similarity (both described later).

For example, it is assumed that the representative point $FP_A$ belongs to the cluster A, and a feature point P1, a feature point P2, and a feature point P3 belong to the cluster A. Moreover, when the feature quantities of the feature point P1 (activity log data at the position of the feature point P1) are stride=150, pace=6, and heart rate change=30; the feature quantities of the feature point P2 (activity log data at the position of the feature point P2) are stride=160, pace=5, and heart rate change=10; and the feature quantities of the feature point P3 (activity log data at the position of the feature point P3) are stride=140, pace=7, and heart rate change=−10; the feature quantities of the representative point are obtained from averages thereof and, as such, are stride=150, pace=6, and heart rate change=10. However, in the case of this example, the variances of the stride and the pace are comparatively small but the variance of the heart rate change is excessively great. As such, it is understood that the reliabilities of the stride and the pace are high, but the reliability of the heart rate change is low.

Then, the controller 210 generates the description information of each representative point on the basis of the feature quantities calculated in step S106 and the number of feature points counted in step S105, records the generated description information in the description point database (step S107), and ends the description point generation processing. As a result of the description point generation processing described above, the position, the feature quantities, and the description information of each description point (representative point) is stored in the description point database of the storage 220.

Note that information about existing specific points (so-called POI information) is recorded in the map information, but the controller 210 may be configured to record the information of the description point database (the position information and the description information of each representative point) generated by the description point generation processing in the map information. Moreover, the controller 210 may be configured to treat the description points (can be regarded as newly generated POI) in the same manner as the existing specific points (existing POI). By configuring in this manner, information about description points that does not originally exist in the map information is added to the map information as new POI information. Additionally, when adding the new POI information to the map information, the controller 210 may record, in the map information as the information about specific points (the POI information), the position and the description information of the description points of the information in the description point database. That is, the feature quantities of the description points need not be recorded in the map information.

Next, the generation of the description information of each representative point in step S107 is described in further detail. Firstly, the controller 210 acquires description basic information by referencing, on the basis of the feature quantities of a representative point, a feature quantity correspondence table 222, such as illustrated in FIG. 11, in which correspondence between conditions of the feature quantity (feature quantity conditions) and the description basic information is defined, and generates the description information from the description basic information. In FIG.

11, for ease of description, the feature conditions are "great", "few", and the like and specific values are not illustrated but, in actuality, any desired condition can be set. For example, a threshold may be set, and when greater than the threshold, when less than the threshold, when in a certain range of values, and the like may be set as the feature conditions.

Additionally, in FIG. 11, an item of "cause" is illustrated, but this is to facilitate the description of the correspondence between the feature quantity condition and the description basic information and, in actuality, the item of "cause" is unnecessary in the feature quantity correspondence table 222. Moreover, expressions involving the statistic information obtained from statistic log data and the like, such as illustrated in the right column of the description basic information, may be included in the description basic information.

In one example, it is assumed that values such as illustrated in FIG. 12 are calculated as the feature quantities of the representative point of each cluster. Note that, here, for ease of description, specific numerical values are not illustrated. Additionally, feature quantities for which variance is great and reliability is low are marked with a "−" symbol. Moreover, for feature quantities related to change, changes in the positive direction are marked with a "(+)" symbol, and changes in the negative direction are marked with a "(−)" symbol.

In the example illustrated in FIG. 12, of the feature quantities of the cluster representative point $FP_A$, the heart rate change is "great in the positive direction." Referencing the feature quantity correspondence table 222 illustrated in FIG. 11, when the heart rate change is great in the positive direction, "(when a slope) This is a heart-wrenching slope with heart rate of XXX; (when unclear if a slope) This area puts a lot of stress on your heart" is obtained as the description basic information.

The server 200 stores the map information in the storage 220 and, as such, can also acquire the terrain in the vicinity of the cluster representative point $FP_A$ from the map information, and can determine whether the vicinity of the cluster representative point $FP_A$ is a slope. Here, a case is considered in which the vicinity of the cluster representative point $FP_A$ is a slope. Additionally, in FIG. 12, the heart rate of the cluster representative point $FP_A$ is illustrated as "high" but, in actuality, a specific value (for example, 180) is obtained. As such, the controller 210 can generate the description information such as, for example, "This is a heart-wrenching slope with heart rate of 180" on the basis of the description basic information, terrain information, and the heart rate information.

Likewise, at the cluster representative point $FP_B$, of the feature quantities, the amount of stationary time is "long." In the feature quantity correspondence table 222 illustrated in FIG. 11, when the amount of stationary time is long, "This is a good place to rest" is obtained as the description basic information.

In FIG. 12, the amount of stationary time of the cluster representative point $FP_B$ is "long" but, in actuality, a specific value (for example, five minutes) is obtained. As such, the controller 210 can generate the description information such as, for example, "This is a good place to rest. The average rest time is five minutes" on the basis of information such as the description basic information, the amount of stationary time, and the like (for example, the controller 210 may analyze the statistic log data in the runner database 221 to obtain a more accurate amount of rest time).

Likewise, at the cluster representative point $FP_C$, of the feature quantities, the pace is "fast." In the feature quantity correspondence table 222 illustrated in FIG. 11, when the pace is fast, "This is an area with many fast-paced people, and it is easy to run" and "If your pace is X, you are the Yth fastest among the runners who have passed through here" are obtained as the description basic information.

In FIG. 12, the pace of the cluster representative point $FP_C$ is "fast" but, in actuality, a specific value (for example, 6 min/km) is obtained. The controller 210 creates information in which the paces of all the runners that passed through the feature points belonging to the cluster of the cluster representative point $FP_C$ are ranked, and calculates the rank (for example, third) obtained at that pace (for example, 6 min/km). The controller 210 can generate description information such as, "This is an area with many fast-paced people, and it is easy to run. If your pace is 6 min/km, you are the third fastest among the runners who have passed through here" on the basis of these pieces of information.

The controller 210 records the description information generated in this manner in the description point database. That is, the controller 210 provides the description information generated to the representative point of the cluster (associates with the representative point and stores in the storage 220). As a result, the controller 210 can, as illustrated in FIG. 1, for example, display the representative point of the cluster as a description point 320 on the route together with the description information 321.

Note that, in the feature quantity correspondence table 222 illustrated in FIG. 11, the description basic information is defined for one type of feature quantity condition (a feature quantity condition), but the description basic information may be defined for a plurality of feature quantity conditions. Additionally, the feature quantity conditions included in the feature quantity correspondence table 222 illustrated in FIG. 11 are examples, and conditions for feature quantities not described in the feature quantity correspondence table 222 can also be defined as desired.

Additionally, when a plurality of feature quantity conditions are matched, all of the description information generated on the basis of the description basic information corresponding to each of the feature quantity conditions may be displayed. For example, when, of the feature quantities of a certain representative point, the stride is long and the number of stops is many, the controller 210 may generate the description information such as "This area is suitable for stride running technique. There may be interesting things around."

When generating the description information, the controller 210 need not necessarily use the feature quantity correspondence table 222. For example, at all of the feature points (cluster configuration points) in the cluster to which the representative point belongs, the types of feature quantities that exceed (or are below) a reference value may be extracted, and description sentences may be generated on the basis of the extracted feature quantities. For example, when the heart rate is 120 or higher at all of the cluster configuration points, the controller 210 may generate a description sentence such as "This is a point where your heart rate is 120 or higher."

Figure 13:
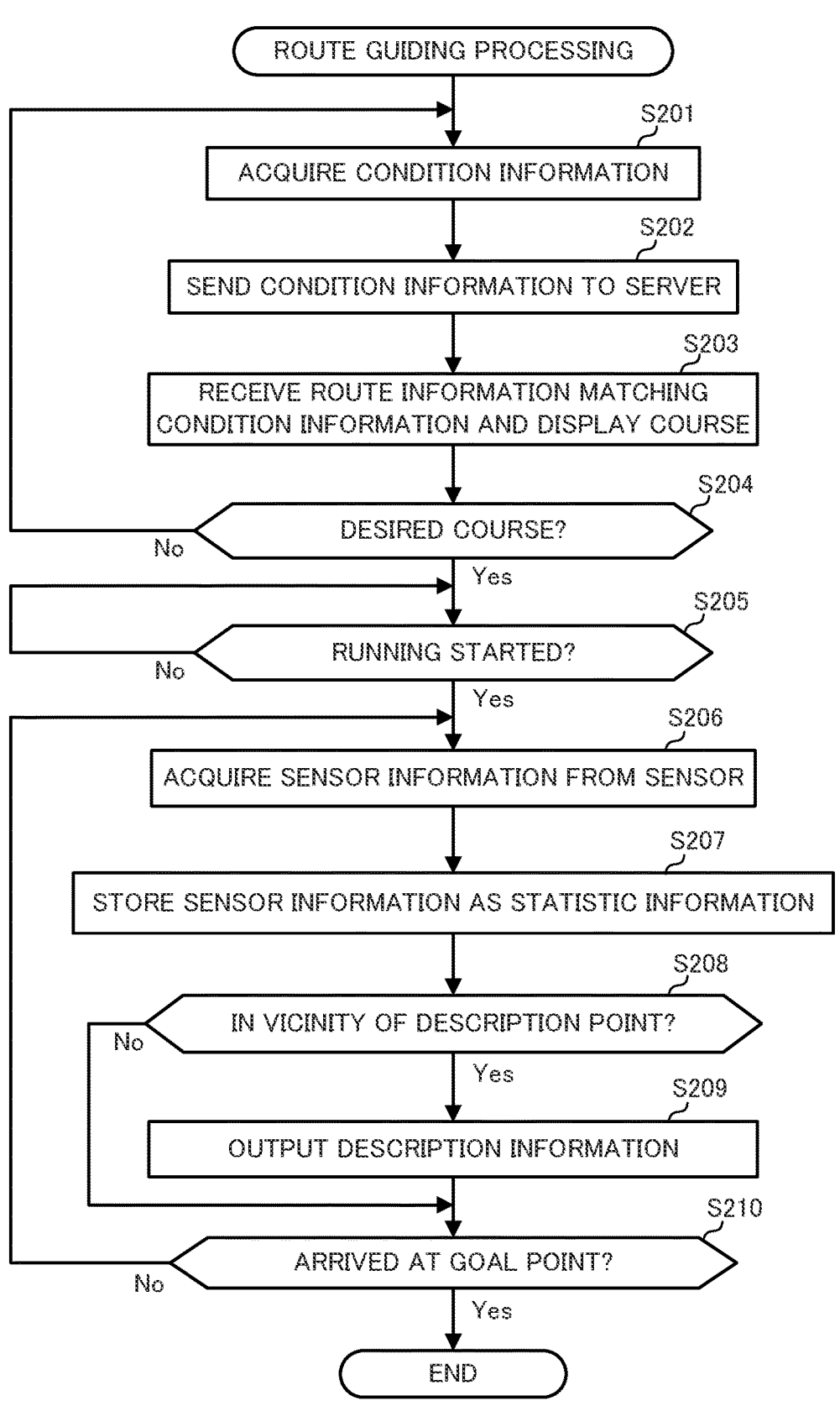
FIG. 13 is a flowchart of route guiding processing according to the embodiment.

Next, processing (route guiding processing) for outputting the description information described above, in the electronic device 100 that is worn by the user when running, is described while referencing FIG. 13. Execution of the route guiding processing is started when the user commands the electronic device 100 to execute the route guiding processing.

Firstly, the controller 110 of the electronic device 100 acquires, from the user via the inputter 130, information (condition information) about a running course that satisfies conditions desired by the user (step S201). In this step, the controller 110 displays the screens illustrated in FIGS. 14 and 15, for example, on the display of the outputter 140, and acquires information (condition information) about the running course that is input by the user.

Next, the controller 110 sends the acquired condition information to the server 200 via the communicator 150 (step S202). Then, the server 200 performs a search of running courses on the basis of the condition information, and sends route information (information about a running course candidate, or the like) matching the condition information to the electronic device 100. The controller 110 of the electronic device 100 receives the route information from the server 200, and displays a running course on the display of the outputter 140 on the basis of the route information (step S203).

Figure 16:
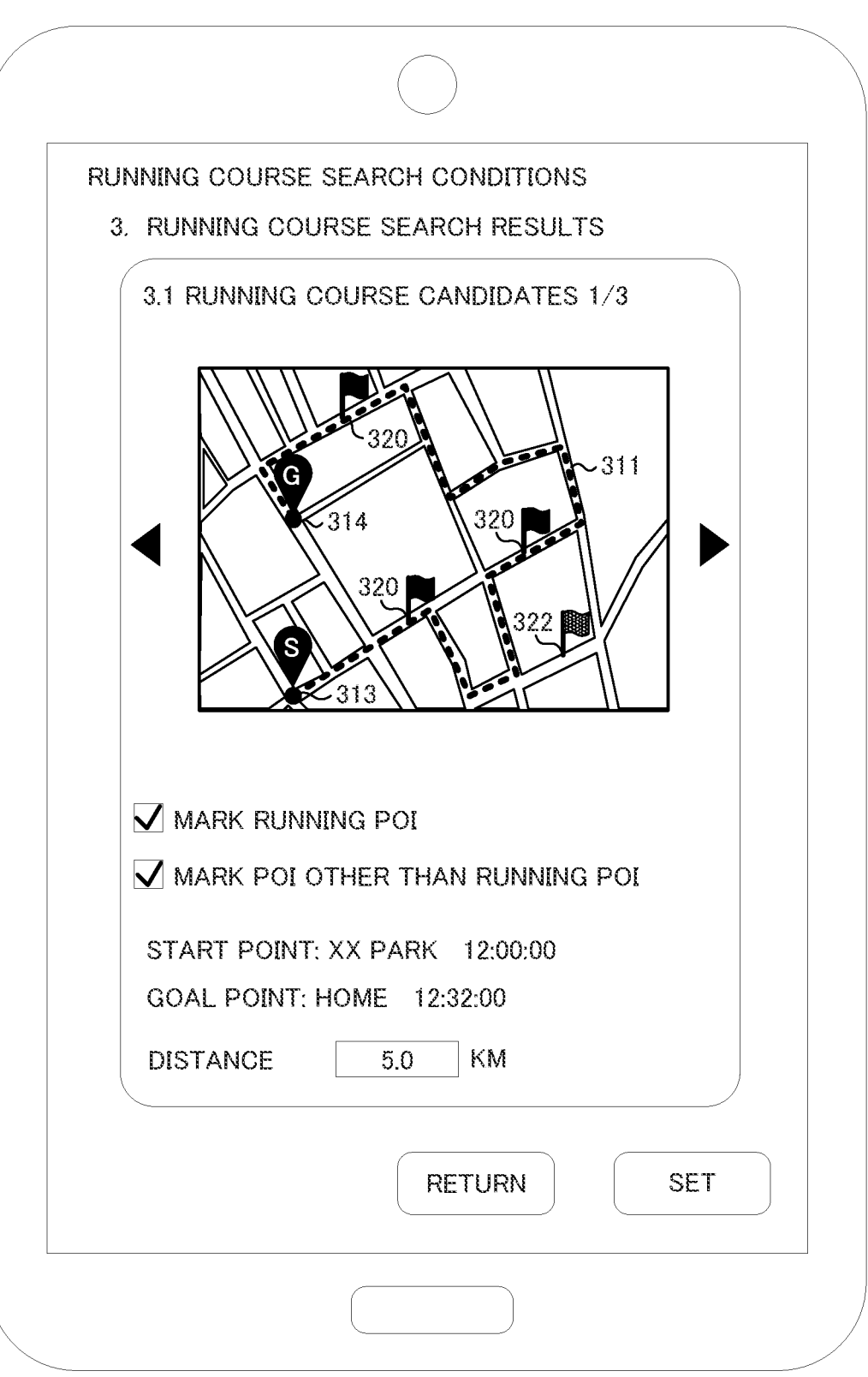
FIG. 16 is an example of a screen for displaying running course search results in the route guiding processing according to the embodiment.

In this step, the controller 110 displays a running course candidate as illustrated in FIG. 16, for example, on the display of the outputter 140. In FIG. 16, a route 311 of the running course is illustrated as a dashed line from a start point 313 to a goal point 314, and representative points that exist on the route 311 are illustrated with flag marks as the description points 320.

Next, the controller 110 confirms with the user whether the route is a desired route (step S204). When the route is not a desired route (step S204; No), step S201 is executed.

When the route is a desired route (step S204; Yes), the controller 110 determines whether running has started in order to stand by until the user starts running (step S205). The controller 110 may make the determination about the start of running on, for example, the basis of a detected value from the sensor 160, or may simply determine that running has started when the user presses a button of the inputter 130 that informs "start running."

When running has not started (step S205; No), step S205 is executed. When running has started (step S205; Yes), the controller 110 acquires the sensor information from the sensor 160 (step S206), and stores the sensor information as the statistic information in the storage 120 (step S207).

Then, the controller 110 determines whether the user has arrived in the vicinity of a description point (whether the current position of the user is in the vicinity of a description point) (step S208). In this step, the controller 110 can perform the determination of whether the user has arrived in the vicinity of a description point by comparing the current position acquired by the GPS device of the sensor 160 and the position information of the description points.

When the current position of the user is not in the vicinity of a description point (step S208; No), the controller 110 executes step S210. When the current position of the user is in the vicinity of a description point (step S208; Yes), the controller 110 outputs, by speech and from the speaker of the outputter 140, the description information corresponding to that description point (step S209), and executes step S210.

In step S210, the controller 110 determines whether the user has arrived at the goal point 314. When the user has not arrived at the goal point 314 (step S210; No), step S206 is executed. When the user has arrived at the goal point 314 (step S210: Yes), the route guiding processing is ended.

Figure 17:
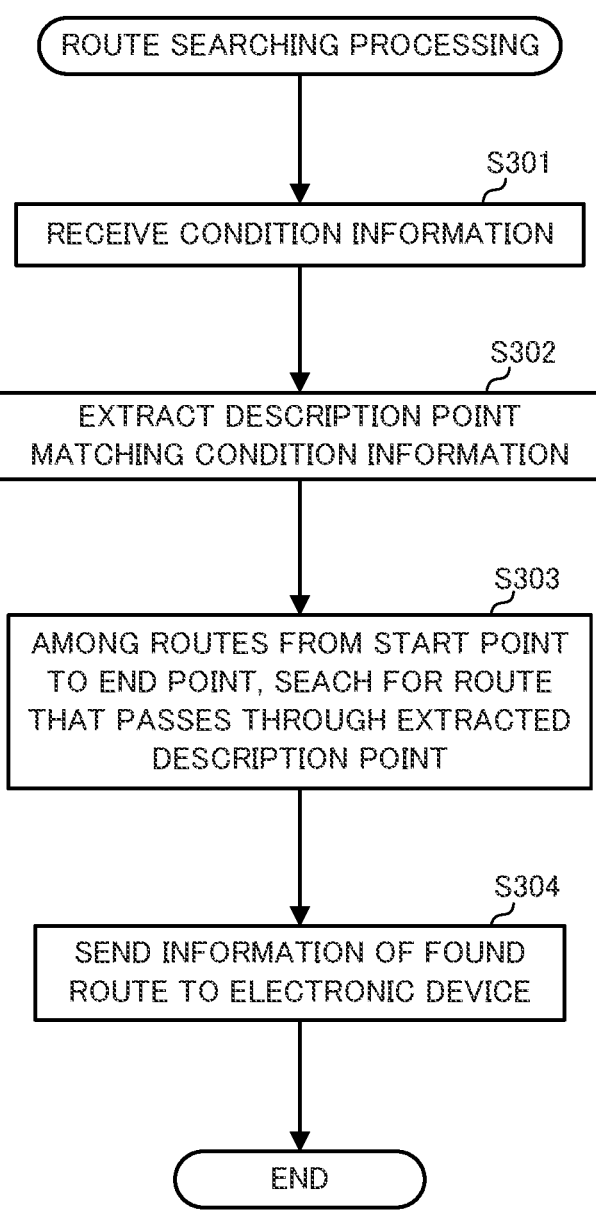
FIG. 17 is a flowchart of route searching processing according to the embodiment.

The server 200 searches, on the basis of the condition information sent in step S202, for a route that the user desires, and this processing (route searching processing) is described while referencing FIG. 17. The route searching processing fundamentally is processing for extracting, on the basis of the condition information, a description point that satisfies a condition, and sending, to the electronic device 100, a course that satisfies a condition from among courses that pass through the extracted description point.

Firstly, the controller 210 of the server 200 receives, via the communicator 250, the condition information sent from the electronic device 100 (step S301).

Next, the controller 210 extracts the description point matching the received condition information (step S302). The description point generation processing (FIG. 6) is performed in advance in the server 200, and the description points to which feature quantities and description information are provided are stored in the description point database of the storage 220. Accordingly, in this step, the controller 210 extracts the description point matching the condition information on the basis of the feature quantities and the description information of the various description points.

Then, the controller 210 searches, on the basis of information about the start point and the goal point included in the condition information and the map information stored in the storage 220, from among routes from the start point to the goal point, a route that passes through the description point extracted in step S302 and that matches the route condition (for example, course distance) included in the condition information (step S303).

Then, the controller 210 sends information (route information) about the route that is found to the electronic device 100 (step S304), and ends the route searching processing.

For example, in "User running level settings" illustrated in FIG. 14, "Average pace about 5 min/km" is selected. Accordingly, the controller 210 of the server 200, that receives this setting as the condition information, references information about the level of each runner from the runner database 221, and extracts, as a search target runner, a runner whose average pace is about 5 min/km (for example, a runner whose pace is faster than 5:30/km and slower than 4:30/km). If "Do not set" is selected here, the search target runner is all of the runners in the runner database 221.

In "Running course search condition settings" illustrated in FIG. 15, "Current position" is set as the "start point" and "5 km" is set as the "course distance." Moreover, since "Set goal point" is not checked, the goal point is not set but, in this case, a default goal point (for example, the home of the user) is the goal point. Furthermore, "Include as many running POI as possible", "Include points passed by runners of the same level", and "Include rest locations that runners frequently visit" are set as "Waypoints." Note that, the term "running POI" refers to the description point that is the representative point of the cluster to which the feature points linked to the search target runner belong. This description point (running POI) can be thought of as a description point linked to the search target runner.

Accordingly, the controller 210 of the server 200 that receives these settings as the condition information firstly extracts approximately 5 km running course candidates that start from the current position and return to the goal point (for example, the home of the user). Then, the controller 210 further filters the extracted running course candidates on the basis of the waypoint settings.

For example, in order to satisfy the condition of "Include as many running POI as possible", courses that pass through as many description points, linked to the search target runner, extracted using the settings as illustrated in FIG. 14 are extracted from among the running course candidates. Moreover, in order to satisfy the conditions of "Include points passed by runners of the same level" and "Include rest locations that runners frequently visit", the controller 210 extracts points that runners, in the runner database 221, of the same level as the user pass through and points of rest locations that runners frequently visit, and further extracts courses that pass through such points from the courses extracted so far.

When the server 200 receives notification that the user has clicked the "Search" button, the server 200 sends route information related to the courses extracted so far to the electronic device 100. Then, the running course candidates matching the conditions set so far are displayed as "Running course search results" as illustrated in FIG. 16 on the display of the outputter 140 of the electronic device 100.

In FIG. 16, it can be confirmed that the course is a course in which the start point 313 is XY park, which is the current position, the goal point 314 is the home of the user, the distance of the route 311 from the start point 313 to the goal point 314 is 5 km, and three description points 320 are passed through. Additionally, since "Mark running POI" is checked, it can be confirmed that the description points 320 recorded in the description point database are indicated by flag marks. Moreover, since "Mark POI other than running POI" is checked, it can be confirmed that specific points 322 originally included in the map information are also indicated by flag marks. Furthermore, FIG. 16 also illustrates that, when starting from the start point 313 at the current time, namely 12:00:00, it is estimated, on the basis of the activity log data of the user to-date, that the user will arrive at the goal point 314 at 12:32:00.

Note that, in step S302 of the route searching processing (FIG. 17) described above, the controller 210 extracts the description point from the description point database and, as such, the description point matching the condition information is extracted from new POI generated by the description point generation processing. However, in step S302, the controller 210 may extract not only from the description point database, but also extract the description point matching the condition information from the existing POI stored as the map information in the storage 220.

As described above, due to the description point generation processing, the controller 210 can generate, as information for searching routes that better match the desires of the user, information about description points to which feature quantities and description information are added. Additionally, due to the route searching processing, the controller 210 can search, on the basis of the condition information of the user, routes that better match the conditions desired by the user. Moreover, due to the route guiding processing, in the vicinity of a description point, the controller 110 can notify the user of information describing that description point.

The running course search conditions illustrated in FIGS. 14 and 15 are merely examples. For example, a setting of "Course with few traffic lights" may be provided. In such a case, when position information of traffic lights is included in the map information, the controller 210 records, on the basis of that information, the center of gravity or the like of an area in which there are few traffic lights in the description point database as a description point (description point where traffic lights are few), and searches for a course that passes through this description point. When traffic light information is not included in the map information, the controller 210 may separately download data from which the position information of traffic lights can be obtained and record the center of gravity or the like of an area in which there are few traffic lights in the description point database as a description point (description point where traffic lights are few), or may record, on the basis of the activity log data in the runner database 221 stored in the storage 220, the center of gravity or the like of an area in which there are few runner stops in the description point database as a description point (description point where traffic lights are few).

Additionally, in FIG. 14, runners filtered on the basis of the average pace are used as the search target runners. However, for example, runners filtered on the basis of score, height, weight, gender, and the like, or runners filtered on the basis of a condition obtained by combining these conditions may be used as the search target runners. Moreover, the controller 210 searches for a running course that passes through, on the route, description points that the search target runners obtained by the filtering (condition filtering) pass through (pass through when running).

Filtering (content filtering) may also be performed in which description points, having feature quantities similar to the feature quantities of the description points existing in the course selection history and the actual travel history of the user to-date, are set as points to be passed through on the route. When searching for the description points having similar feature quantities, the plurality of feature quantities of a description point is normalized and organized into one vector to calculate a feature vector of the description point, and description points having a high degree of similarity (for example cosine similarity) with the feature vector are set as the description points having similar feature quantities. Note that, in one example, the normalized feature quantities can be calculated as illustrated in Equation (1) below.

$$\text{Normalized feature quantity } a' = (\text{feature quantity } a - \text{average of feature quantity } a)/(\text{variance of feature quantity } a) \quad (1)$$

Additionally, the effect of feature quantities with low reliability can be reduced by multiplying the right side of Equation (1) by the reliability (for example, $1/(1+\text{standard deviation of feature quantity } a)$) of the feature quantity a.

In some cases, feature quantities with low reliability (feature quantities that are "−" such as the number of stops at cluster representative points $FP_A$ and $FP_B$ of FIG. 12) may be included. In such a case, it is possible to user only the feature vectors in which the number of feature quantities with low reliability is less than or equal to a certain number in the degree of similarity calculation; or calculate the degree of similarity in a state in which the feature quantities with low reliability are excluded, estimate the feature quantities with low reliability on the basis of the elements of the other vectors and, then, calculate the degree of similarity.

A configuration is possible in which filtering (collaborative filtering) is performed in which description points frequently used by users similar to the user are set as the points to be passed through on the route. Additionally, a configuration is possible in which these three types of filtering (condition filtering, content filtering, and collaborative filtering) are combined (for example, an AND operation or an OR operation is performed on the results of each filtering) to perform the filtering. This is hybrid filtering.

Note that, typically, feature quantities such as those provided to the description points described above are not provided to the specific points (existing POI) included in the map information. However, by providing the feature quantities manually to the specific points to be subjected to the filtering, or providing the feature quantities on the basis of the information (POI data) of the specific points, in addition to the description points, the specific points to which the feature quantities are provided can also be subjected to the filtering. Additionally, when the feature quantities are manually provided to the existing POI, the controller 210 can associate the description information generated on the basis of those feature quantities and the feature quantity correspondence table 222 with the existing POI stored as the map information in the storage 220.

In the embodiment described above, an example is described in which the activity of the user is mainly running, but the activity of the user handled by the electronic device 100 and the server 200 is not limited to running. For example, a configuration is possible in which the activity of the user is walking or cycling. That is, the activity of the user is any activity that involves movement. Likewise, the condition information described above is not limited to the information about running courses that satisfy the conditions desired by the user, and may be information expressing any condition related to an activity that involves movement.

Other Modified Examples

Note that the electronic device 100 is not limited to a smart watch, and can be realized by a smartphone provided with the sensor 160, or a computer such as a portable tablet, a personal computer (PC), or the like. Additionally, the server 200 can also be realized by a computer such as a PC or the like. Specifically, in the embodiment described above, an example is described in which the program of the route guiding processing and the like executed by the controller 110 is stored in advance in the storage 120, and the program of the description point generation processing and the like executed by the controller 210 is stored in advance in the storage 220. However, a computer may be configured that is capable of executing the various processings described above by storing and distributing the programs on a non-transitory computer-readable recording medium such as a compact disc read-only memory (CD-ROM), a digital versatile disc (DVD), a magneto-optical, disc (MO), a memory card, and a USB memory, and reading out and installing these programs on the computer.

Furthermore, the program can be superimposed on a carrier wave and applied via a communication medium such as the internet. For example, the program may be posted to and distributed via a bulletin board system (BBS) on a communication network. Moreover, a configuration is possible in which the various processings described the above are executed by starting the programs and, under the control of the operating system (OS), executing the programs in the same manner as other applications/programs.

Additionally, a configuration is possible in which the controller 110 or the controller 210 is constituted by a desired processor unit such as a single processor, a multi-processor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:
1. An information processing device comprising:
a storage storing map information including geographical feature data; and at least one hardware processor operably coupled to the
storage and configured to:
  acquire statistic information corresponding to a posi-
    tion or area obtained during an activity involving
    movement, the statistic information being obtained
    based on values detected by a sensor;
  acquire a feature quantity of the position or area
    obtained based on the statistic information;
  associate description information corresponding to the
    feature quantity with a representative point that is a
    point representing the position or area;
  record the representative point with which the descrip-
    tion information is associated in the map information
    as a specific point;
  acquire, as condition information, information express-
    ing a condition related to the activity; and
  search, based on the condition information and from
    the map information including the specific point, for
    a route on which to move by the activity.
2. The information processing device according to claim
1, wherein the hardware processor is configured to:
  acquire, based on the statistic information, a feature-like
    position or area as a feature point,
  calculate the representative point from each cluster
    obtained by clustering acquired feature quantity points,
  calculate, based on the statistic information of the feature
    point belonging to the cluster of the calculated repre-
    sentative point, a feature quantity of the representative
    point, and
  associate the description information corresponding to the
    calculated feature quantity with the representative
    point.
3. The information processing device according to claim
2, wherein the hardware processor is configured to:
  extract, as a feature point, a position at which an absolute
    quantity or an amount of change of the statistic infor-
    mation exceeds a threshold, and
  set a center of gravity of positions of all of the feature
    points belonging to the cluster as the representative
    point of the cluster.
4. The information processing device according to claim
1, wherein the hardware processor is configured to:
  reference a feature quantity correspondence table to gen-
    erate the description information from the feature quan-
    tity of the representative point, and
  associate the generated description information with the
    representative point.
5. The information processing device according to claim
4, wherein:
  the feature quantity correspondence table is a table in
    which correspondence between a feature quantity con-
    dition that is a condition for the feature quantity and
    description basic information is illustrated, and
  the processor is configured to:
    generate, based on the description basic information
      corresponding to the feature quantity condition, the
      description information corresponding to the repre-
      sentative point when the feature quantity of the
      representative point satisfies the feature quantity
      condition illustrated in the feature quantity corre-
      spondence table, and
    associate the generated description information with
      the representative point.
6. The information processing device according to claim
1, wherein the statistic information includes information
related to a position acquired by a satellite positioning
device, and information related to a detected value detected by at least one sensor among an acceleration sensor, a
gyrosensor, and a heart rate sensor.
7. An electronic device, comprising:
  a satellite positioning device that acquires a current posi-
    tion; and
  a hardware processor,
  wherein the hardware processor is configured to:
    acquire, from a user as the condition information,
      information expressing a condition related to the
      activity,
    send the condition information to the information pro-
      cessing device according to claim 1,
    acquire a route found by the information processing
      device based on a result of the search using the con-
      dition information sent thereto, and
    when the current position acquired by the satellite posi-
      tioning device arrives in a vicinity of the description
      point, output the description information.
8. The electronic device according to claim 7, wherein the
condition information includes at least one piece of infor-
mation from among a condition specified by a user, an
activity history of the user, and an activity history of a user
similar to the user.
9. The information processing device according to claim
1, wherein the hardware processor is configured to:
  acquire a reliability of the feature quantity; and
  associate the description information corresponding to a
    feature quantity having a high reliability with the
    representative point, and cause the representative point
    to be recorded as the specific point in the map infor-
    mation.
10. An information processing method executed under
control of at least one hardware processor operably coupled
to a storage storing map information including geographical
feature date, the information processing method comprising,
by the hardware processor:
  acquiring statistic information corresponding to a position
    or area obtained during an activity involving move-
    ment, the statistic information being obtained based on
    values detected by a sensor;
  acquiring a feature quantity of the position or area
    obtained based on the statistic information;
  associating description information corresponding to the
    feature quantity with a representative point that is a
    point representing the position or area;
  recording the representative point with which the descrip-
    tion information is associated in the map information as
    a specific point;
  acquiring, as condition information, information express-
    ing a condition related to the activity; and
  searching, based on the condition information and from
    the map information including the specific point, for a
    route on which to move by the activity.
11. The information processing method according to
claim 10, further comprising:
  acquiring, based on the statistic information, a feature-like
    position or area as a feature point,
  calculating the representative point from each cluster
    obtained by clustering acquired feature quantity points,
  calculating, based on the statistic information of the
    feature point belonging to the cluster of the calculated
    representative point, a feature quantity of the represen-
    tative point, and
  associating the description information corresponding to
    the calculated feature quantity with the representative
    point.

12. The information processing method according to claim 11, further comprising:

extracting, as a feature point, a position at which an absolute quantity or an amount of change of the statistic information exceeds a threshold, and setting a center of gravity of positions of all of the feature points belonging to the cluster as the representative point of the cluster.

13. The information processing method according to claim 10, further comprising:

referencing a feature quantity correspondence table to generate the description information from the feature quantity of the representative point, and associating the generated description information with the representative point.

14. The information processing method according to claim 13, wherein:

the feature quantity correspondence table is a table in which correspondence between a feature quantity condition that is a condition for the feature quantity and description basic information is illustrated, and the method further comprises:

generating, based on the description basic information corresponding to the feature quantity condition, the description information corresponding to the representative point when the feature quantity of the representative point satisfies the feature quantity condition illustrated in the feature quantity correspondence table, and associating the generated description information with the representative point.

15. A non-transitory recording medium storing a program executable by at least one processor of an information processing device including a storage storing map information including geographical feature data, the hardware processor being operably coupled to the storage, and the program being executable to control the hardware processor to execute processing comprising:

acquiring statistic information corresponding to a position or area obtained during an activity involving movement, the statistic information being obtained based on values detected by a sensor;

acquiring a feature quantity of the position or area obtained based on the statistic information;

associating description information corresponding to the feature quantity with a representative point that is a point representing the position or area;

recording the representative point with which the description information is associated in the map information as a specific point;

acquiring, as condition information, information expressing a condition related to the activity; and searching, based on the condition information and from the map information including the specific point, for a route on which to move by the activity.

* * * * *